(12) United States Patent
Gonzalez

(10) Patent No.: US 8,851,739 B2
(45) Date of Patent: Oct. 7, 2014

(54) PORTABLE BABY BOTTLE BLENDER

(76) Inventor: Osmay Gonzalez, Hialeah Gardens, FL (US)

( * ) Notice: Subject to any disclaimer, the term of this patent is extended or adjusted under 35 U.S.C. 154(b) by 578 days.

(21) Appl. No.: 12/848,145

(22) Filed: Jul. 31, 2010

(65) Prior Publication Data

US 2011/0024537 A1    Feb. 3, 2011

Related U.S. Application Data

(60) Provisional application No. 61/230,573, filed on Jul. 31, 2009.

(51) Int. Cl.
*A47J 43/046* (2006.01)
*A61J 9/00* (2006.01)
*A61J 9/06* (2006.01)

(52) U.S. Cl.
CPC . *A47J 43/046* (2013.01); *A61J 9/06* (2013.01); *A61J 9/00* (2013.01)
USPC ............ 366/130; 366/199; 366/205; 366/314

(58) Field of Classification Search
CPC ...................................................... A47J 43/046
USPC .................................. 366/130, 199, 205, 314
See application file for complete search history.

(56) References Cited

U.S. PATENT DOCUMENTS

| | | | | |
|---|---|---|---|---|
| 2,640,907 | A * | 6/1953 | Morey | 219/433 |
| 3,704,684 | A | 12/1972 | Brown | |
| 3,735,888 | A * | 5/1973 | Jacko | 215/11.5 |
| 3,881,705 | A * | 5/1975 | Greenspan | 241/282.2 |
| 5,052,593 | A | 10/1991 | Grome et al. | |
| 5,425,579 | A | 6/1995 | Sampson | |
| 5,639,161 | A | 6/1997 | Sirianni | |
| 5,720,552 | A | 2/1998 | Schindlegger | |
| 5,797,313 | A * | 8/1998 | Rothley | 99/483 |
| 5,911,504 | A * | 6/1999 | Schindlegger, Jr. | 366/197 |
| 6,283,627 | B1 | 9/2001 | Fromm | |
| 7,066,640 | B2 | 6/2006 | Sands | |
| 7,281,842 | B2 | 10/2007 | Dickson, Jr. | |
| 7,430,957 | B2 | 10/2008 | Sands | |
| 2005/0105387 | A1 | 5/2005 | Nikkhah | |
| 2006/0007781 | A1 * | 1/2006 | Martin et al. | 366/274 |
| 2008/0037360 | A1 | 2/2008 | McGill | |
| 2008/0047439 | A1 | 2/2008 | Tracy et al. | |
| 2008/0259722 | A1 | 10/2008 | Sanford | |
| 2008/0304356 | A1 | 12/2008 | Zhuang | |
| 2009/0301904 | A1 * | 12/2009 | Bullard et al. | 206/221 |

* cited by examiner

*Primary Examiner* — David Sorkin
(74) *Attorney, Agent, or Firm* — Thien Tran, Esq; Access Patent Group, LLC

(57) ABSTRACT

A portable baby bottle blender includes a baby bottle having a top collar with external threads and a bottom collar with external threads. A top cap has a central aperture. The top cap is internally threaded to be removable threaded onto the top collar of the baby bottle and holds a feeding nipple extending through the central aperture of the top cap onto the top collar. A sealing O-ring fits onto the bottom collar of the baby bottle. A bottom cap has a rim internally threaded. An agitating unit is centrally retained within the bottom cap. When the rim of the bottom cap is removably threaded onto the bottom collar of the baby bottle and against the sealing O-ring, the agitating unit extends into the bottom collar of the baby bottle. A base member has a top recess to receive the bottom cap on the baby bottle therein. A spur-crown gear coupling is for operating the agitating unit, so that the mixing blade assembly mixes formula within water placed through the top collar of the baby bottle.

8 Claims, 5 Drawing Sheets

PORTABLE BABY BOTTLE BLENDER

CROSS-REFERENCE TO RELATED APPLICATION

This application claims the benefit of Provisional Patent Application Ser. No. 61/230,573, filed on Jul. 31, 2009, in the United States Patent & Trademark Office, the disclosure of which is incorporated herein by reference.

BACKGROUND OF THE INVENTION

1. Field of the Invention

The present invention relates to a mixing apparatus, and more particularly, a portable baby bottle blender. The portable baby bottle blender is a battery-operated device that can be utilized to easily and thoroughly mix powdered formula in a baby bottle. The present invention can assist individuals in creating a baby bottle for a child even when a standard blender may not be available. The portable baby bottle blender is ideal for use when traveling or at home to fix an infant a baby bottle of formula with the solution being thoroughly blended with little effort.

2. Description of the Prior Art

When mixing powdered formula in a baby bottle, one may have to shake it in order for the solution to thoroughly mix. This can be aggravating, especially when done half-asleep in the middle of the night. Manually shaking may also not completely dissolve chunks of formula within the baby bottle. Using a standard blender may be time consuming and may require one to be near an electrical outlet for use, which may not always be possible. Routinely cleaning an entire blender may also be annoying.

Numerous innovations for stirring devices have been provided in the prior art that will be described. Even though these innovations may be suitable for the specific individual purposes to which they address, however, they differ from the present invention.

A FIRST EXAMPLE, U.S. Pat. No. 3,704,684, Issued on Dec. 5, 1972, to Lee teaches mixing devices, such as food mixers. One embodiment includes a mixer unit which may be removably, sealingly affixed to the top of a receptacle containing the material to be mixed and the combination thereafter inverted during the mixing operation. Thereby a short-shafted universal mixer device may be used with a wide variety of receptacles.

A SECOND EXAMPLE, U.S. Pat. No. 5,639,161, Issued on Jun. 17, 1997, to Sirianni teaches a blender cup apparatus comprising a rigid hollow base having a top wall, a bottom wall, a peripheral side wall; a open cup coupled to the top wall of the base; a lid removably secured over the cup; a battery removably disposed within the base for supplying electrical energy; a motor having a fixed stator coupled to the battery and base and a rotatable rotor extended upwards through the top wall and into the cup with the stator imparting rotational motion to the rotor; a propeller coupled to the rotor of the motor within the cup; a power switch extended from the base and coupled to the battery; and a pressure switch extended from the base and coupled between the motor and power switch, the power switch having an enabled orientation for allowing delivery of electrical energy to the pressure switch and a disabled orientation for preventing such delivery, the pressure switch having a depressed orientation for allowing electrical energy to be delivered to the motor and further having a released orientation for preventing such delivery.

A THIRD EXAMPLE, U.S. Pat. No. 5,911,504, Issued on Jun. 15, 1999, to Schindlegger Jr. teaches a stirring device for a container, such as a baby bottle, the stirring device exhibiting a recess which closes off the container opening when the container is inverted. The recess is fitted with an inner wall section with an inside thread for screwing in the container. A drive shaft of a stirrer extends through the bottom of the recess. The housing consists of an outer wall section, the inner wall section with the bottom and a ring section which connects the outer wall section with the inner wall section. The housing is closed off with a bottom plate. The batteries that supply electrical power to the stirrer motor are placed vertically between the outer wall section and the inner wall section.

A FOURTH EXAMPLE, U.S. Pat. No. 6,283,627, Issued on Sep. 4, 2001, to Fromm teaches a drink mixer which may be used by children as well as by adults to mix a liquid with a wide variety of ingredients including air, other liquids, or solids, which may be comminuted during mixing. The device consists of four major components or assemblies, these being a tapered cylindrical container, a container top assembly, a handle assembly, and a mixing disk carried by the handle assembly. The parts are so designed so that the mixing disk may be pushed down repeatedly by the handle assembly to mix the liquid within the container with other ingredients, an internal spring returning the mixing disk to its raised position. The container top assembly is secured to the container in a liquid tight manner, the container top assembly having a pour spout which may be covered tightly. A part which changes color when the contents change temperature may be incorporated into the mixer.

A FIFTH EXAMPLE, U.S. Patent Office Publication No. 2005/0105387, Published on May 19, 2005, to Nikkhah teaches a sports bottle blender for use with a mixing apparatus to blend mixed drinks. The sports bottle has a top with a closable opening therein such as a spout. A blade assembly is positioned at the bottom of the sports bottle extending into the sports bottle cavity. When the sports bottle is positioned on a mixing apparatus, such as a blender, the blade assembly operatively engages the blender such that operation of the blender causes the blade assembly to rotate. The rotation of the blade assembly mixes the ingredients in the sports bottle. The lower portion of the sports bottle is preferably detachable from the upper portion to provide easy access to the blade assembly for cleaning.

A SIXTH EXAMPLE, U.S. Pat. No. 7,066,640, Issued on Jun. 27, 2006, to Sands teaches a blender system including a mixing base is capable of agitating the contents of a plurality of containers. The mixing base includes a rotating shaft, a recessed well, a pressure-actuated switch positioned about the periphery of the recessed well, and a locking groove. One container that may be used with the mixing base has an opening at one end and a base at a second end, where the base is tapered. The container also includes one or more locking members in spaced relation about the periphery of the container body. The container body may be provided with a handle. The container also includes a ring that is selectively attachable and removable from the periphery of the opening such that when the ring is coupled to the container, the user is able to drink from the container without spilling or dripping.

A SEVENTH EXAMPLE, U.S. Pat. No. 7,281,842, Issued on Oct. 16, 2007, to Dickson Jr. teaches a blending container which may include one or more walls and a handle secured to the one or more walls. The blending container may have a generally rectangular shape. The blending container may also include a mixing blade that rotates on an axis. The blending container may be configured so that a vortex created when liquid is blended inside the container is not positioned over the axis. The blending containers may also be configured to stack inside one another.

AN EIGHTH EXAMPLE, U.S. Patent Office Publication No. 2008/0037360, Published on Feb. 14, 2008, to McGill teaches a method of preparing a blended food product includes the steps of: introducing a composition of food product(s) into a container, providing a closure for the container, the closure carrying an impeller; inverting the container so that the closure with its blending element lies lowermost; and driving the blending element to blend the composition to form a blended food product. Prior to blending, the container is mounted in a holder and clamped in place between the closure and the holder, to prevent leakage during blending. The holder may be in the form of a sleeve. A drive master is also provided for use with two sets of blending lids.

A NINTH EXAMPLE, U.S. Patent Office Publication No. 2008/0047439, Published on Feb. 28, 2008, to Tracy et al. teaches a method and apparatus for steaming and blending food products such as baby food. The apparatus includes a base including a steam chamber and a drive shaft. A container assembly can be mounted to the base in an inverted position for steaming the food and in an upright position for blending the food. The apparatus may further include a baby bottle sterilizing unit and a bottle warmer.

A TENTH EXAMPLE, U.S. Pat. No. 7,430,957, Issued on Oct. 7, 2008, to Sands teaches a blender and juicer system that comprises a blender container having an open top and an open bottom, and a removable juicer member being open at each end and adapted for insertion into the blender container. The blender container is adapted to prevent the over-insertion of the removable juicer member. The inserted juicer member is adapted to engage operatively the interior of the blender container. The blender and juicer system also comprises a plunger adapted for insertion into the juicer member. The inserted plunger is utilized during a juice extraction operation. The plunger includes a top exterior lip which defines the optimal range of plunger insertion into the juicer member.

AN ELEVENTH EXAMPLE, U.S. Patent Office Publication No. 2008/0259722, Published on Oct. 23, 2008, to Sanford teaches a blender for production of scented materials has mutually connecting containers or chambers that attach to a conventional motorized blender base. The chambers include a mixing chamber having a removable blade assembly and base attachment mount, a filtration chamber installed upon the mixing chamber, and a collection chamber installed upon the filtration chamber. The filtration chamber may include one or more scent absorbent pads removably installed in the neck thereof. The blender is used by assembling the mixing chamber upon the blender base, adding ingredients and liquid, installing the filtration and collection chambers, and operating the blender. When the ingredients have been mixed and comminuted, the chamber assembly is removed from the base and inverted to drain the liquid mixture through the scent absorbent discs and into the collection bottle. The discs and collection bottle are then removed for use in distributing the scent.

A TWELFTH EXAMPLE, U.S. Patent Office Publication No. 2008/0304356, Published on Dec. 11, 2008, to Zhuang teaches a shaker which is driven by a motor through a swing mechanism so as to swing a wine bottle, for example, drink within the bottle such as wine. The shaker comprises a base, a container, and a bottle seat disposed at a bottom in the container for receiving a bottle body, characterized in that the drink shaker further comprises a swing mechanism disposed in the base and driven by the motor through a conversion mechanism, and the swing mechanism is capable of driving the bottle seat to swing rightward and leftward in a plane or in different planes. The wine is wobbled by the swinging so that the wine continuously rises to a surface of the wine alternatively to be sufficiently and fully oxidized with air. Ice water or warm water can be provided to the shaker as a heat exchange medium. The water is stirred by the swinging of the wine bottle to be uniform in temperature, thereby speeding up cooling or warming of the wine. The shaker has effects of quick breathing, cooling, and warming of wine. The shaker has moving portions, which can excite appetite for drinking. In addition, the power required to swing the drink in the bottle can be reduced to save energy consumption.

It is apparent now that numerous innovations for stirring devices have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a portable baby bottle blender that avoids the disadvantages of the prior art.

ANOTHER OBJECT of the present invention is to provide a portable baby bottle blender that is simple and inexpensive to manufacture.

STILL ANOTHER OBJECT of the present invention is to provide a portable baby bottle blender that is simple to use.

BRIEFLY STATED, STILL YET ANOTHER OBJECT of the present invention is to provide portable baby bottle blender comprises a baby bottle having a top collar with external threads and a bottom collar with external threads. A feeding nipple is provided. A top cap has a central aperture. The top cap is internally threaded to be removable threaded onto the top collar of the baby bottle and holds the feeding nipple extending through the central aperture of the top cap onto the top collar. A sealing O-ring fits onto the bottom collar of the baby bottle. A bottom cap has a rim internally threaded. An agitating unit is centrally retained within the bottom cap. When the rim of the bottom cap is removably threaded onto the bottom collar of the baby bottle and against the sealing O-ring, the agitating unit will extend into the bottom collar of the baby bottle. A base member has a top recess to receive the bottom cap on the baby bottle therein. A mechanism in the base member is for operating the agitating unit, so that the agitating unit will mix formula within water placed through the top collar of the baby bottle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The FIGS. 1-7 of the drawings are briefly described as follows.

Figure 1:
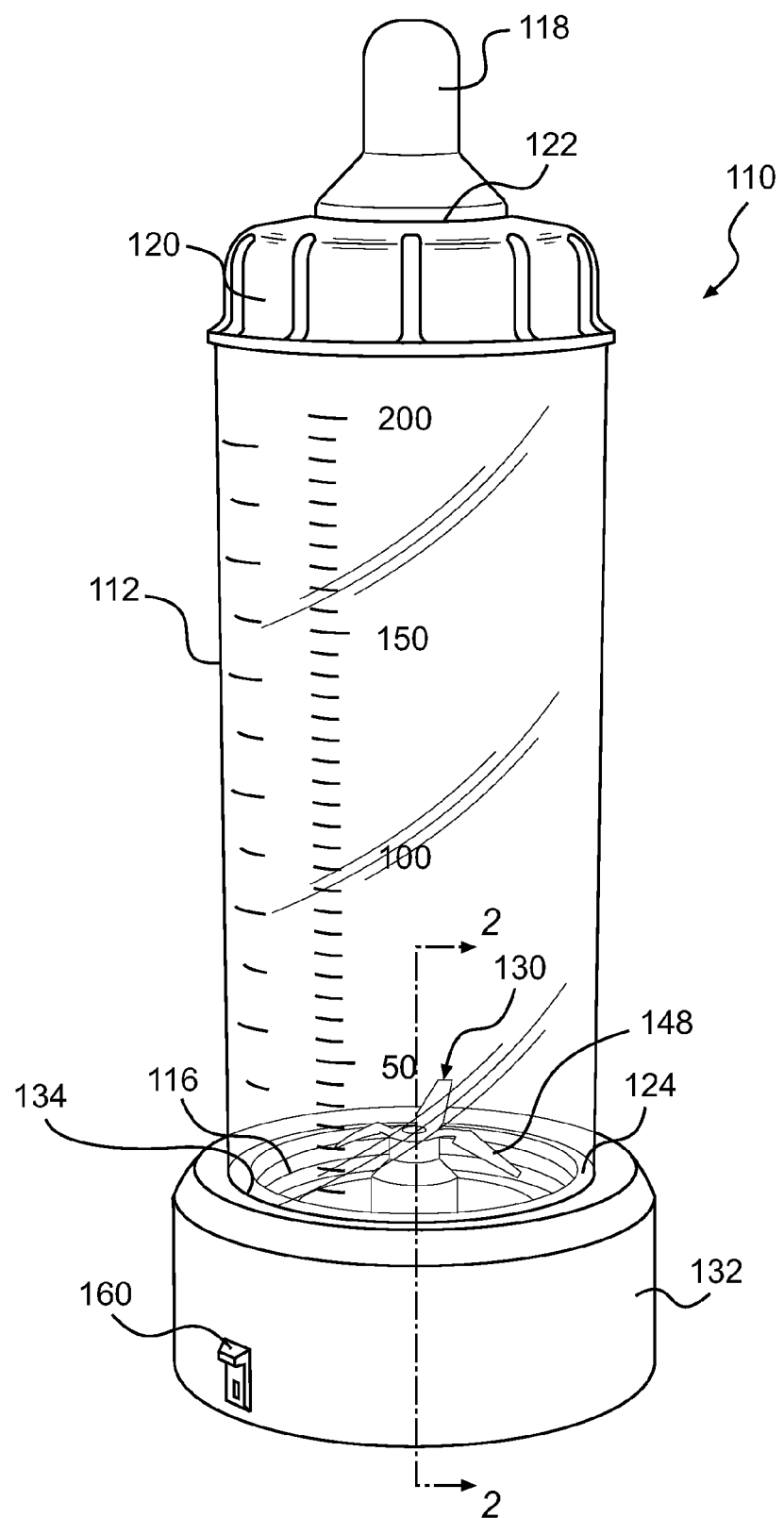
FIG. 1 is a perspective view of the present invention assembled.

REFERENCE NUMERALS UTILIZED IN THE DRAWING 110 portable baby bottle blender
112 baby bottle of blender 110
114 top collar of baby bottle 112
116 bottom collar of baby bottle 112
118 feeding nipple of blender 110
120 top cap of blender 110
122 central aperture in top cap 120
124 sealing O-ring of blender 110
126 bottom cap of blender 110
128 rim of bottom cap 126
130 agitating unit of blender 110
132 base member of agitating unit 130
134 top recess in base member 132
138 formula
140 water
142 retaining mechanism of agitating unit 130
144 bayonet slot of retaining mechanism 142
146 pin of retaining mechanism 142
148 mixing blade assembly for agitating unit 130
150 electric motor of agitating unit 130
152 horizontal drive shaft of electric motor 150
154 spur gear of agitating unit 130
156 crown gear of agitating unit 130
158 vertical driven shaft of crown gear 156
160 switch of agitating unit 130
162 power source of agitating unit 130
164 double A battery of power source 162
166 second type bottom cap

DETAILED DESCRIPTION OF THE PREFERRED EMBODIMENT

Figure 2:
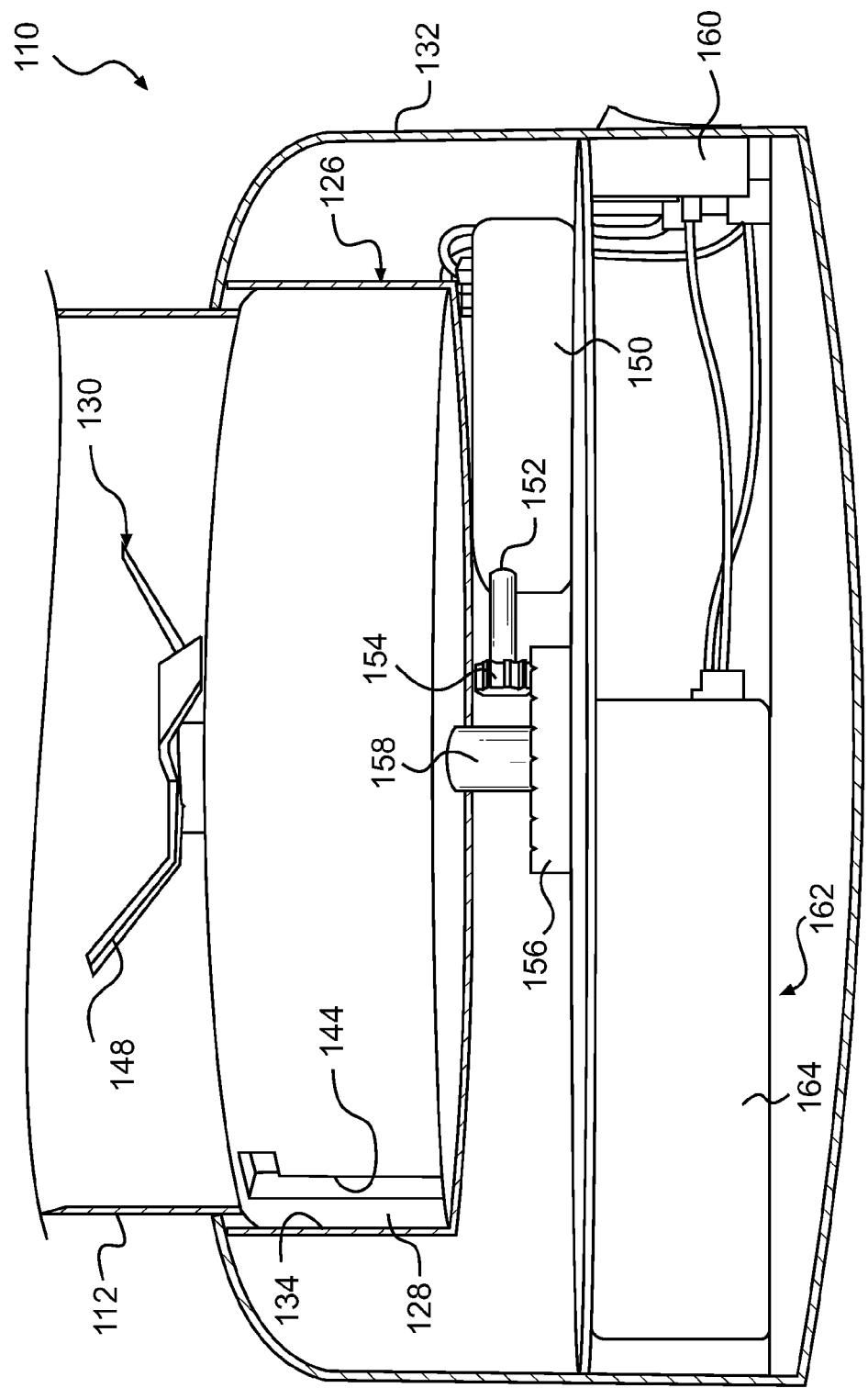
FIG. 2 is an enlarged partially cross sectional perspective view taken along line 2-2 in FIG. 1.
Figure 4:
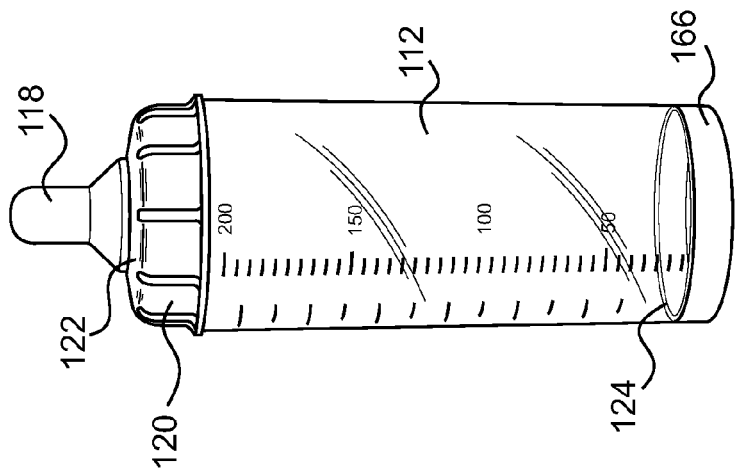
FIG. 4 is a perspective view showing a second type of bottom cap threaded onto the bottom collar of the baby bottle.
Figure 3:
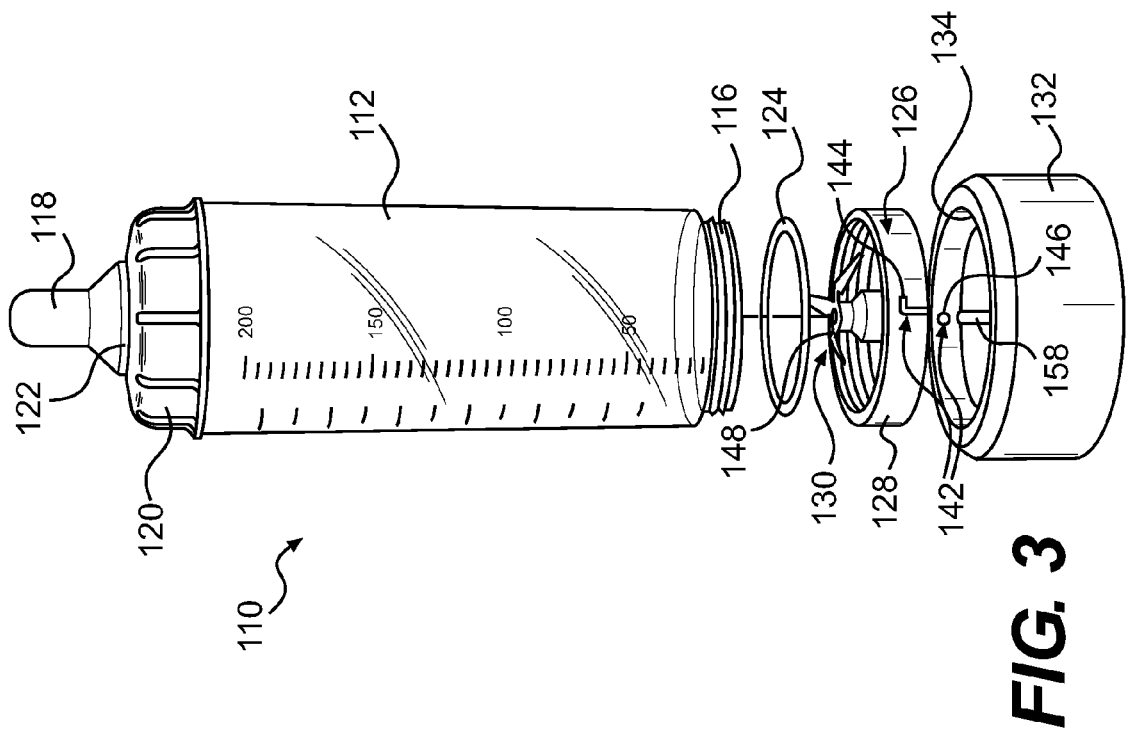
FIG. 3 is an exploded perspective view of the present invention.
Figure 5:
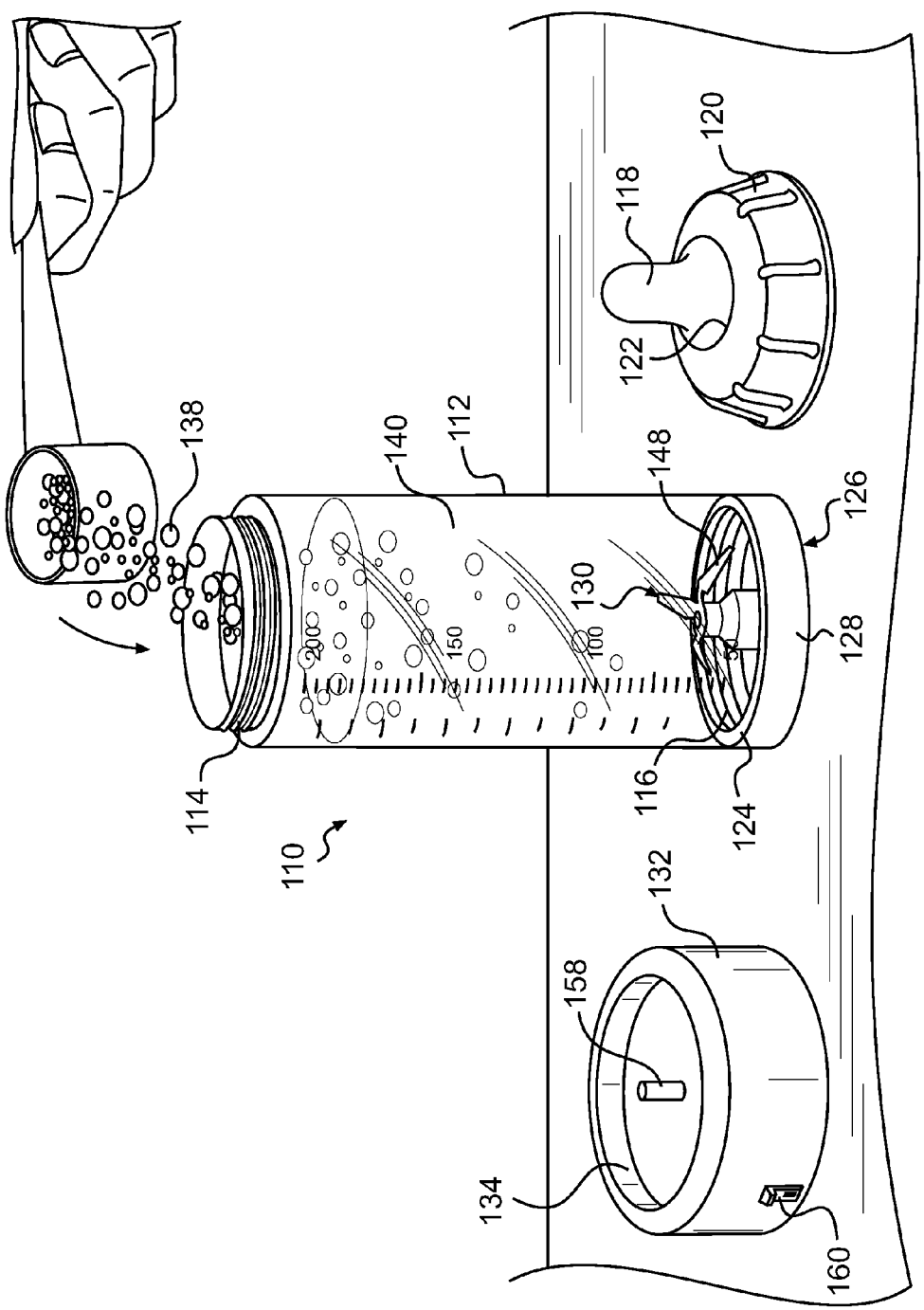
FIG. 5 is a perspective view showing formula being added to water in the baby bottle.
Figure 7:
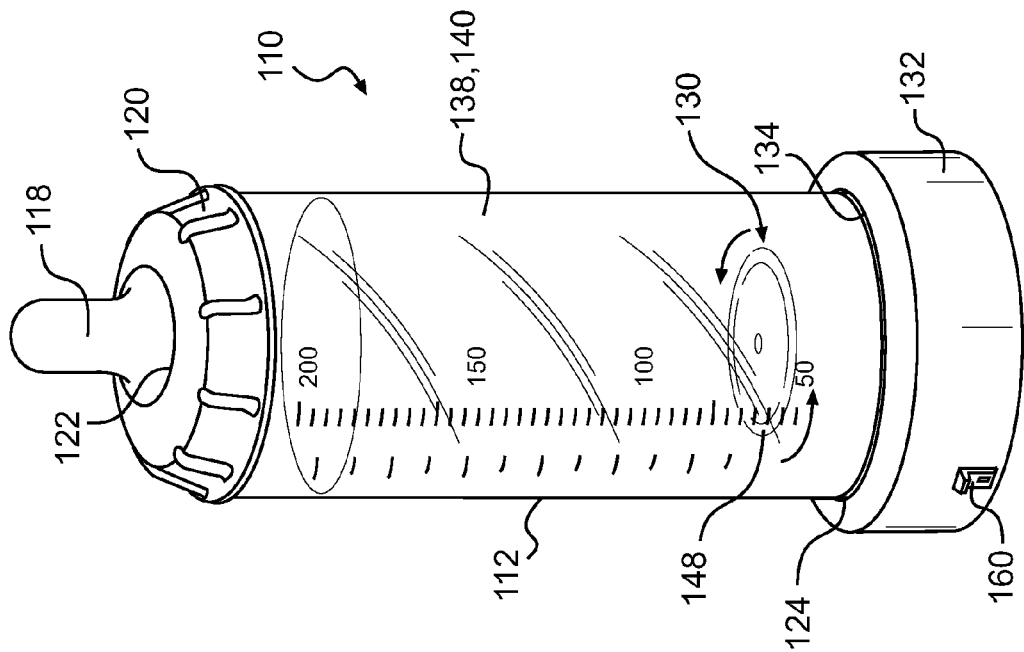
FIG. 7 is a perspective view of the present invention in use, mixing the baby formula into the water in the baby bottle.
Figure 6:
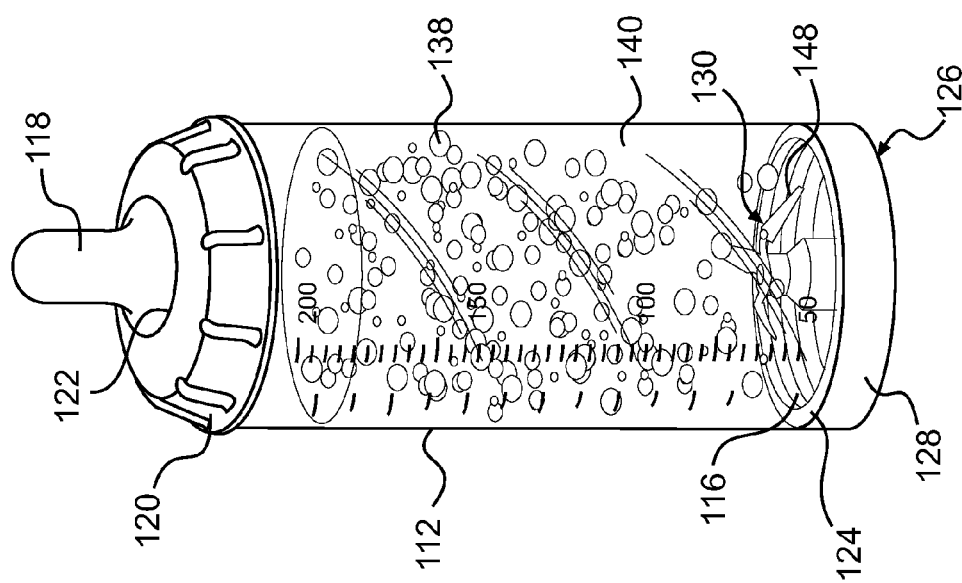
FIG. 6 is a perspective view after the formula is added to the water in the baby bottle.

Referring now to the figures, in which like numerals indicate like parts, and particularly to FIGS. 1 through 7, and as such, will be discussed with reference thereto.

The present invention is a portable baby bottle blender 110 which comprises a baby bottle 112 having a top collar 114 with external threads and a bottom collar 116 with external threads. A feeding nipple 118 is provided. A top cap 120 has a central aperture 122. The top cap 120 is internally threaded to be removable threaded onto the top collar 114 of the baby bottle 112 and holds the feeding nipple 118 extending through the central aperture 122 of the top cap 120 onto the top collar 114. A sealing O-ring 124 fits onto the bottom collar 116 of the baby bottle 112.

A bottom cap 126 has a rim 128 internally threaded. An agitating unit 130 is centrally retained within the bottom cap 126. When the rim 128 of the bottom cap 126 is removably threaded onto the bottom collar 116 of the baby bottle 112 and against the sealing O-ring 124, the agitating unit 130 will extend into the bottom collar 116 of the baby bottle 112. A base member 132 has a top recess 134 to receive the bottom cap 126 on the baby bottle 112 therein. A mechanism 136 in the base member 132 is for operating the agitating unit 130, so that the agitating unit 130 will mix formula 138 within water 140 placed through the top collar 114 of the baby bottle 112.

The blender 110 further comprises a mechanism 142 for retaining the bottom cap 126 within the top recess 134 of the base member 132. The retaining mechanism 142 comprises the rim 128 of the bottom cap 126 having at least one external bayonet slot 144 therein. The top recess 134 of the base member 132 has at least one pin 146 extending therefrom to engage with the at least one external bayonet slot 144 in the rim 128 of the bottom cap 126. The agitating unit 130 comprises a mixing blade assembly 146 located within the base member 132.

The agitating unit 130 comprises an electric motor 150 secured in the base member 132 and a gear coupling. The electric motor 150 has a horizontal drive shaft 152. A spur gear 154 is on a distal end of the horizontal drive shaft 152. A crown gear 156 is rotatable by the spur gear 154. The crown gear 156 has a vertical driven shaft 158 that extends up through the top recess 134 of the base member 132 and into the agitating unit 130 in the bottom cap 126. The motor 150 is in horizontal position. The shaft 158 of agitating unit 130 is VERTICAL. The mixing blade assembly 148 is coupling with motor 150 via a gear coupling. Therefore, the motor 150 is away from the leak. Normally, the leak comes from the hole under the mixing blade assembly 148. It goes along the shaft 158 of the agitating unit 130.

A switch 160 on the base member 132 is electrically connected to the electric motor 150. A power source 162 in the base member 132 is electrically connected to the switch 160. When the switch 160 is turned on the power source 162 will activate the electric motor 150 to rotate the drive shaft 152 allowing the spur gear 154 to turn the crown gear 156 and the driven shaft 158, causing the mixing blade assembly 148 to spin.

The power source 162 is comprised of two double A batteries 164. The blender 110 further comprises a second type of bottom cap 166 without the agitating unit 130 that was centrally retained therein (see FIG. 4).

In summary the portable baby bottle blender 110 is an apparatus that can be used to mix formula 138 without employing a messy, inefficient, standard method. The agitating unit 130 consists of a base member 132, which may house two rechargeable double A batteries 164, an electric motor 150 and a horizontal drive shaft 152. The range of batteries is from 1.5 volts to 9 volts. The motor 150 can have speed from 25 rpm-1075 rpm. An optional speed controller can be used and set to slow, medium or fast for 3-speed motor.

A battery housing door can be on the base member 132 and may slide off and on. On the side of the base member 132 is a switch 160 to turn the agitating unit 130 off or on. The base member 132 has a top recess 134 in the center with two pins 146 that extends out on the sides. The pins 146 line up with two bayonet slots 144 on the rim 128 of the bottom cap 126. The vertical shaft 158 also extends through the bottom cap 126, into the agitating unit 130. The agitating unit 130 has a mixing blade 148 that spins to mix the formula 138. A seal O-ring 124 prevents any liquid from leaking.

The baby bottle 112 is completely straight so that the bottom cap 126, the top cap 120 for the feeding nipple 118 can be screwed onto either end. The bottom cap 126 may be replaced with a second type of bottom cap 116 as well. A home and car charging base may also be included. The blender 110 may be produced from BPA-free plastic and similar, durable materials. For use, one may place formula 138 in the water 140 in the baby bottle 112. Then, place the baby bottle 112 on the base member 132 and turn on switch 160. After the formula 138 is thoroughly mixed in the water 140 one has the option of changing the bottom cap 126 to the second type cap 166 or leave the original bottom cap 126 in place. The blender 110 may be the same size as a standard baby bottle. The exact dimensions, materials used for construction and method of operation of the portable baby bottle blender 110 may vary upon manufacturing.

It will be understood that each of the elements described above, or two or more together, may also find a useful application in other types of constructions differing from the types described above.

While the invention has been illustrated and described as embodiments of a baby bottle blender, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A portable baby bottle blender which comprises:
    a) a baby bottle having a top collar with external threads and a bottom collar with external threads;
    b) a feeding nipple;
    c) a top cap having a central aperture, the top cap being internally threaded to be removable threaded onto the top collar of the baby bottle and holds the feeding nipple extending through the central aperture of the top cap onto the top collar;
    d) a sealing O-ring which fits onto the bottom collar of the baby bottle;
    e) a bottom cap having a rim being internally threaded;
    f) an agitating unit centrally retained within the bottom cap, wherein when the rim of the bottom cap is removably threaded onto the bottom collar of the baby bottle and against the sealing O-ring, the agitating unit extends into the bottom collar of the baby bottle;
    g) a base member having a top recess to receive the bottom cap on the baby bottle therein; and
    h) an operating means, in the base member, for operating the agitating unit, so that the agitating unit will mix formula within water placed through the top collar of the baby bottle; and wherein the operating means comprises:
    1) an electric motor secured in the base member, the electric motor having a horizontal drive shaft;
    2) a spur gear on a distal end of the horizontal drive shaft;
    3) a crown gear rotatable by the spur gear, the crown gear having a vertical driven shaft that extends up through the top recess of the base member and into the agitating unit in the bottom cap;
    4) a switch on the base member electrically connected to the electric motor; and
    5) a power source in the base member electrically connected to the switch, whereby when the switch is turned on the power source will activate the electric motor to rotate the drive shaft allowing the spur gear to turn the crown gear and the driven shaft, causing the agitating unit to spin.

2. The blender as recited in claim 1, further comprising a means for retaining the bottom cap within the top recess of the base member.

3. The blender as recited in claim 2, wherein the retaining means comprises:
    a) the rim of the bottom cap having at least one external bayonet slot therein; and
    b) the top recess of the base member having at least one pin extending therefrom to engage with the at least one external bayonet slot in the rim of the bottom cap.

4. The blender as recited in claim 1, wherein the agitating unit comprises a mixing blade assembly attachable to the operating means within the base member.

5. The blender as recited in claim 1, wherein the power source comprises two double A batteries.

6. The blender as recited in claim 1, wherein the power source has a range of 1.5 volts to 9 volts.

7. The blender as recited in claim 1, wherein the motor has speed of 25 rpm to 1075 rpm.

8. The blender as recited in claim 1, further comprising a second type of bottom cap without the agitating unit that was centrally retained therein.

* * * * *